July 1, 1969    G. R. GAUT    3,452,834
AUTOMOTIVE SAFETY DEVICE
Filed Nov. 21, 1966
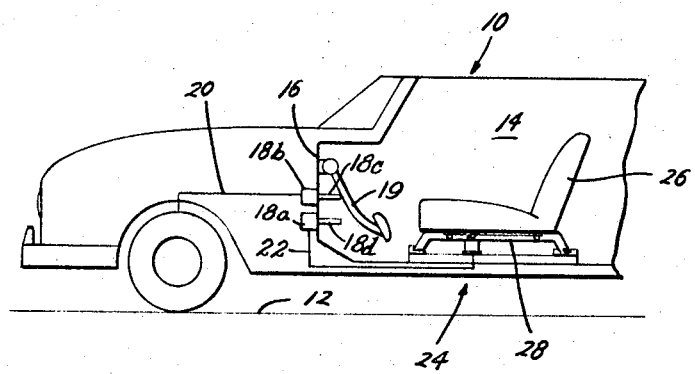
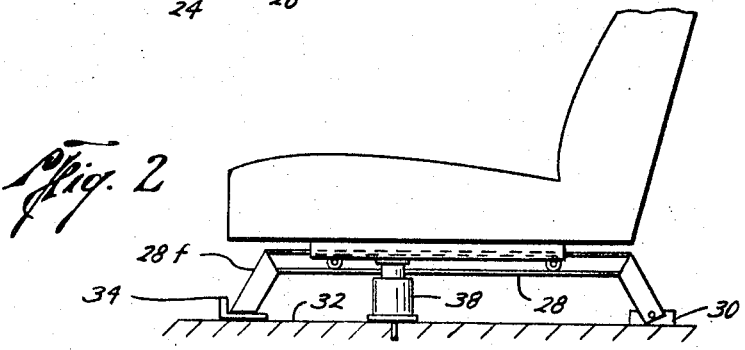
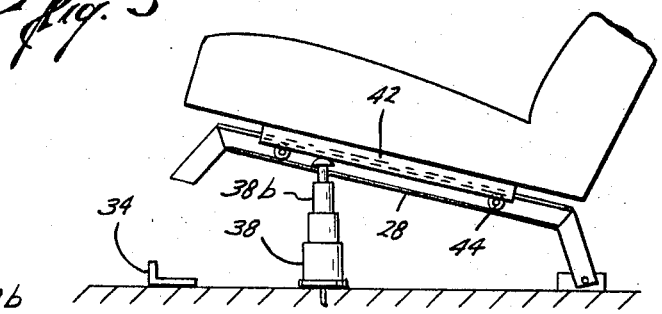
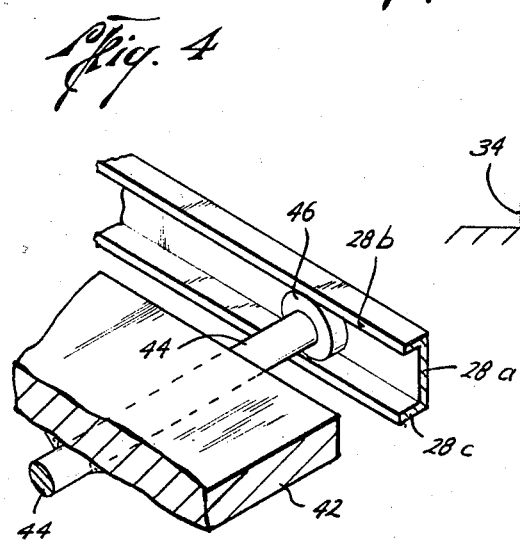
George R. Gaut
INVENTOR.
BY Donald Gunn
ATTORNEY United States Patent Office 3,452,834
Patented July 1, 1969

3,452,834
AUTOMOTIVE SAFETY DEVICE
George R. Gaut, 5503 Holly St.,
Houston, Tex. 77036
Filed Nov. 21, 1966, Ser. No. 595,780
Int. Cl. B60t 7/12; B60r 21/02
U.S. Cl. 180—82
6 Claims

ABSTRACT OF THE DISCLOSURE

In motor vehicles having a hydraulic braking system, improved apparatus comprising a pressure responsive jack actuated by the braking system beneath the front seat and adapted to raise the front seat, said seat carried on and adjustable relative to a pair of rails and anchored at one end for pivotal movement and free at the other end for lifting on actuation of the jack.

---

This invention relates to an automotive safety device, and more particularly relates to a device for use in vehicles having passenger seats therein to protect the passengers against injuries received from the dash, steering wheel, safety glass and the like.

Due concern has been expressed over the rising fatalities and injuries attributable to the use of various vehicular means of transportation. Of particular concern is the "secondary impact" received by the passenger on traumatic contact with the dash, steering column, safety glass and forwardly located portions of automotive passenger compartments. The secondary impact usually occurs on sudden braking, stopping, or collision with an object resulting in an excessive deacceleration of the passenger which propels the passenger forwardly with tremendous inertia to collide with the rather solid portions of the automobile. Such injuries are quite dangerous since they usually occur in and about the head of passengers in the vehicle and further include the danger of substantial chest and thorax injuries to the automotive driver sitting behind the steering column. In all events, it will be recognized that substantial harm can result from secondary impact and can result in severe injury or death for the passengers within the automotive passenger compartment.

The recent advent of automotive seat belts has tended to lessen the injuries to passengers generally. However, it will be recognized that the typical automotive seat belts is provided with an anchor point on the floor behind the seat to which is connected the web of protective material extending about the waist of the passenger. While the seat belt may be counted a success in fixing the location of the lower abdomen of the passenger, and for preventing movement of his legs forwardly, it usually merely serves as a pivot point for the rapid rotative movement of the upper portions of the body and can lead to substantial consequences in damaging or hurting the head and chest of the passenger as the upper portions of his body are swung forwardly in an arc about the seat belt. This relates in great detail to the fact that the forward sliding momentum of the passenger seated on the seat in the vehicle is converted to the angular rotation for the upper portions of the body of the passenger to risk substantial injuries to the face and upper chest of the passenger resulting from secondary collision with the structure of the vehicle. With a view of this forward sliding momentum in mind, it is therefore an object of the present invention to provide an automotive safety device with tilts or inclines the seat backwardly to protect the head and upper chest of the passenger by altering the forward momentum into forces pressing the passenger against the base of the seat in the tilted or inclined position.

Another object of the present invention is to provide an automotive safety device cooperating with a passenger seat slidable forwardly and rearwardly in the passenger compartment on rails for comfortable placement wherein the means for tilting the seat lifts the seat and rails together without regard to the location of the seat on rails.

Yet another object of the present invention is to provide new and improved automobile safety device tilting the seat to convert the forward sliding momentum of the passenger on the seat to pressure or force against the seat to prevent the sliding momentum from acting on the head and upper portions of the body of the passenger during sudden stops, collisions and the like.

One object of the present invention is to provide a new and improved automotive safety device for use with passenger seats having waist seat belts installed therein with anchor points on the floor of the passenger compartment to the rear of the passenger seat wherein the pivot point of the passenger seat for rotation by the present invention is near the anchor point of the seat belt.

An important object of the present invention is to provide new and improved safety means for a vehicle which is preferably slaved to the master brake cylinder to rotate the seat to an extent sufficient to dispose of the forward sliding momentum of the passenger during sudden stops and impacts.

Other objects and advantages of the present invention will become more readily apparent after consideration of the following specification and drawings wherein:

FIG. 1 is a somewhat schematic representation of the passenger compartment of an automotive vehicle with the present invention installed therein;

FIG. 2 is an enlarged side view of a passenger seat of an automotive vehicle cooperating with the present invention;

FIG. 3 is a view similar to FIG. 2 showing the present invention tilting or rotating the passenger seat; and FIG. 4 is an isometric view of means providing for forward and rearward adjustment of the passenger seat.

Attention is first directed to FIG. 1 where an automobile 10 is indicated resting on a surface 12. The passenger compartment is indicated at 14 and the automobile 10 is cut away to reveal the interior of the vehicle. A schematic representation of the fireball is included at 16 and mounted thereon is the master brake cylinder 18b which operates, by means of the brake pedal 19, an actuator 18c, in order to provide hydraulic fluid under pressure through the line 20 to the brake of the vehicle. As seen in FIG. 1, another cylinder 18a is mounted adjacent cylinder 18b and has an actuator 18d adapted to be operated by the pedal 19 only on extreme movement of the pedal, such as during severe braking conditions. Extending from the cylinder 18a is an hydraulic line 22 which communicates said cylinder 18a to the present invention 24. The means 24 is provided for rotating the seat 26 whereby the passenger seated thereon is protected from injuries resulting from secondary impact within the vehicle with the dash, steering wheel, and other portions of the structure of the mobile 10 when the brake pedal is applied for severe or emergency braking conditions.

For a detailed consideration of the present invention, attention is directed to FIG. 2 which illustrates the automobile seat 26 in an enlarged view. The seat 26 can be a bench type seat which extends fully across the vehicle or the seat may be sized for one individual only. In either event, the opposite ends of the seat are carried on a pair of rails 28, said rails extending in an approximate parallel fashion forwardly and rearwardly of the seats to permit movement of the seats in adjusting the location of the seat for the comfort of the individual. The rails 28 are preferably U-shaped members as best indicated at FIG. 4 and include the vertically extended side member 28a and a pair of projecting flanges 28b and 28c. Each of the rails is structurally adequate for receiving the weight of the passenger seat 26 and the passengers to secure same relative to the passenger compartment within the automobile 10.

Referring again to FIG. 2, it will be noted that the rails 28 are pivotally joined to a supporting plate 30 welded or otherwise joined to a supporting plate 30 welded or otherwise joined to the floor 32 of the passenger compartment. The mounting plates 30 include an upright member which carries a small shaft or rotatable pivot engaged with an appropriate opening at the rearwardmost end of the rails 28 for pivotally securing the rails for rotation. It will be noted that the shafts are axes of rotation for the rails located in self alignment and are preferably perpendicular to the long dimension of the passenger compartment 14. This permits the seat to rotate facing forwardly in the passenger compartment at all times.

Attention is next directed to the forward ends of the rails 28. It will be noticed that a downwardly extending forward portion 28f of the rails 28 engages a receptacle means 34 located for receiving the freely movable forward ends of the rails 28. Attention is momentarily directed to FIG. 3 which discloses the rails 26 raised above the receptacles 34 to fix the location of the rails in the quiescent position whereby the seat is provided with adequate structural support on the floor 32 of the passenger compartment 14.

The apparatus illustrated in FIG. 2 includes a single acting hydraulic cylinder 38 which has a base mounted plate 38a secured to the vehicular floor 32 by means of welding or the like. The hydraulic apparatus 38 preferably includes an upwardly extending piston 38b shown in FIG. 3 which may include a plurality of piston links as illustrated to obtain the desired stroke on evtension. Of course, the precise form of the hydraulic apparatus 38 is subject to variations and other actuating apparatus may be incorporated with the present invention. The placement of the hydraulic apparatus 38 is preferably centered between the pair of rails and is located somewhat forwardly toward the free or movable end of the rails 28 and is therefore positioned for adequate torque to tilt or rotate the seat 26 in the illustrated manner.

The lower side of the seat 26 is joined to a structural plate 42 which extends substantially across the seat 26 to support the seat springs and other materials. The support plate 42 preferably extends substantially forwardly and rearwardly of the hydraulic jack 38 to provide a suitable engaging surface whereby forward or rearward movement of the seat maintains the support surface above the hydraulic jack. With reference to the movement of the seat 26, it will be appreciated that the rails 28 carry the seat forward and rearward. While the customary seat latching apparatus has been omitted, the present invention accommodates a seat movable relative to the passenger compartment whereby comfortable seating for the passenger is achieved. To this end, the seat is actually supported on the rails 28 by means of rollers 46 received within the flanges of the rails 28 and rotatably mounted on horizontally extending support means 44 connected to the structural support plate 42. In the preferred embodiment, a pair of horizontally extending support rods 44 extend fully across the seat as shown in FIGS. 2 and 3, and the ends serve as support axles for the rollers. It will be appreciated that the rollers may bear against either of the flanges 28b or 28c located adjacent thereto such that the constraint provided by the rails enables the seat 26 to move forwardly or rearwardly as desired. Also, the rails carry the seat upwardly and rotatively as illustrated in FIG. 3 when the safety apparatus of the present invention is operated.

Consideration should be extended to the present invention for an understanding of the operation thereof. Referring first to FIG. 1, it will be noted that the means 24 of the present invention is preferably operated with the cylinder 18a, and as a result is slaved to emergency or sudden stops of the vehicle 10. Therefore, application of the brakes of the vehicle 10 during severe braking actuates the present invention. As seen in FIG. 1, during routine driving circumstances, the brakes when applied in circumstances other than panic stops or other emergencies do not actuate the hydraulic apparatus 38. The present invention as is obvious from FIG. 1 is installed with its own master cylinder operated by the brake pedal only on severe braking. Operation in this manner will provide hydraulic fluid through the hydraulic lines 22 communicated with the hydraulic apparatus 38. On actuation, extensions of the hydraulic apparatus 38 engages the piston with the nether side of the structural plate 42 of the seat 26 and rotates the seat 26. Since the rearwardmost end of the rails 28 is secured to the floor brace 30, and the forwardmost ends thereof are free, rotation of the seat means is achieved whereby the preferred embodiment of the present invention tilts or rotates the seat by lifting the forward end thereof upwardly relative to the rearward portion of seats. This is illustrated in FIGS. 2 and 3 of the present invention.

Reference is made to the fact that the seat 26 is free to move without regard to its location forwardly or rearwardly of the rails 28. That is to say, the rails serve as tracks for movement of the seat to a comfortable position whereby the rotative movement is achieved without preliminary interference with the seat prior to operation of the present invention. Reference is made to the fact that the apparatus is not permanently joined to or connected with the mounting plate 42 located beneath the seat 26 such that the hydraulic apparatus 38 is free to engage the support means 42 at any position forwardly or rearwardly of the position illustrated in the drawings. However, reference is made to the fact that the latching means usually placed on seats for forward and rearward movement of the seat has been omitted for the sake of clarity.

Alterations and changes in the preferred embodiment can be affected without departing from the scope of the present invention. For instance, the seat 26 may be a full width bench type seat providing space for two or even three adults on the seat. In this case, the rails are located near the opposite ends and adjacent to doors of the vehicle 10 to fully support the seat 26. On the other hand, seats preferably suited for one individual such as the common "bucket seats" each require a pair of rails permitting each to be moved individually. In like manner, the hydraulic apparatus 38 may be duplicated beneath a bench type seat to provide two hydraulic jacks 38 spaced from one another laterally of the passenger compartment 14 whereby the seat is lifted from both ends and balanced on the two hydraulic jacks 38. In this case, the hydraulic jacks can be arranged in parallel connections with the single hydraulic line 22.

As a matter of comfort in easing the seat 26 from the tilted position to the conventional position best illustrated in FIG. 1, it may be found desirable to install a bleed valve in the hydraulic line 22 which slowly returns the hydraulic apparatus to the original quiescent position shown in FIG. 1. Further alterations may be achieved in the present invention such as the installation of the hydraulic cylinder 38 for horizontal operation relative to the vehicular floor 32. In such an installation, the hydraulic jack could be used with an eccentric arm projecting downwardly from the seat 26 as the means of converting the rectilinear motion of the hydraulic jack into rotative motion for the seat means 26. It is also possible to provide the present invention with other means for initiating operation thereof.

Other alterations and deviations from the present invention will be recognized by those skilled in the art.

I claim:
1. An automotive safety device for moving passengers seated on the seats thereof to a more safe position in the automobile seating compartment, comprising:
 (a) hydraulic jack means beneath the passenger seat and movable upwardly toward the seat;
 (b) a pair of parallel rails in the automobile passenger compartment;
 (c) said rails being pivotally joined relative to the floor of the passenger compartment near the rearwardmost ends thereof, said ends being received in floor supports and movable relative to said floor supports;
 (d) means for slidably mounting said passenger seat relative to said rails for movement forwardly and rearwardly in the passenger compartment, said means including a means for limiting upward and downward movement of said passenger seat to movement with and to an extent determined by said rails in pivotal movement;
 (e) said jack means being positioned beneath said passenger seat in a manner to raise said passenger seat in pivotal movement of said rails, said jack means in moving extending toward said passenger seat without regard to the forward or rearward position on said rail and without regard to pivotal position of said rails;
 (f) means for operating said jack means to thereby lift said passenger seat; and
 (g) said last named means being operated to extend said jack and thereby raise the forward end of said passenger seat and the passenger seated thereon to provide protection to the head and body portions of the passenger.

2. The invention of claim 1, including U-shaped channels serving as said rails and said means for slidably mounting said passenger seat including rollers captured in said channels to permit movement of said passenger seat forward and rearward on said rails, said channels and rollers preventing upward and downward movement of said passenger seat relative to said rails.

3. The invention of claim 1 including a plate beneath said passenger seat against which said jack means acts.

4. The invention of claim 1 wherein said passenger seat is a bench-type seat extending across the passenger compartment and said rails comprise a pair of rail elements, each located near the outer ends of said seat.

5. The invention of claim 1 wherein said passenger seat is free of impediment by connection to said jack means permitting freedom of adjustment to said passenger seat on said rails.

6. The invention of claim 1 wherein automobile is equipped with seat belts extending forwardly to the seat, and wherein the seat belts are secured to the automobile, said seat belts secured to the automobile in such a manner as to permit movement of the seat without interferring with the operation of the seat belts.

References Cited

UNITED STATES PATENTS

| | | |
|---|---|---|
| 2,335,340 | 11/1943 | Koppelman. |
| 2,433,950 | 1/1948 | Henderson _____ 297—216 |
| 2,660,222 | 11/1953 | Woodsworth. |
| 2,736,566 | 2/1956 | Hartl _____ 296—65 X |
| 2,823,730 | 2/1958 | Lawrence. |

FOREIGN PATENTS

| | | |
|---|---|---|
| 344,629 | 3/1960 | Switzerland. |
| 825,487 | 12/1951 | Germany. |

A. HARRY LEVY, *Primary Examiner.*

U.S. Cl. X.R.

280—150; 296—65; 297—216, 344